United States Patent
Albayrak et al.

(10) Patent No.: US 6,644,145 B2
(45) Date of Patent: Nov. 11, 2003

(54) STEERING WHEEL COMPRISING A DECORATIVE ELEMENT

(75) Inventors: Gökay Albayrak, Neuberg (DE); Michael Lehmann, Aschaffenburg (DE)

(73) Assignee: TRW Automotive Safety Systems GmbH & Co. KG, Aschaffenburg (DE)

(*) Notice: Subject to any disclaimer, the term of this patent is extended or adjusted under 35 U.S.C. 154(b) by 0 days.

(21) Appl. No.: 09/973,204

(22) Filed: Oct. 9, 2001

(65) Prior Publication Data
US 2002/0040617 A1 Apr. 11, 2002

(30) Foreign Application Priority Data
Oct. 9, 2000 (DE) .................. 200 17 288 U

(51) Int. Cl.7 ............... G05G 1/10; B62D 1/06
(52) U.S. Cl. ................................. 74/552; 74/558
(58) Field of Search .................. 74/552, 558, 558.5

(56) References Cited

U.S. PATENT DOCUMENTS
6,401,567 B1 * 6/2002 Sugiyama et al. ........... 74/558
2002/0017157 A1 * 2/2002 Kreuzer et al. ............. 74/552
2002/0026850 A1 * 3/2002 Albayrak et al. ........... 74/552

FOREIGN PATENT DOCUMENTS

| DE | 1912534 | | 10/1969 | |
| GB | 2058694 A | | 4/1981 | |
| JP | 63-176771 | * | 7/1988 | 74/552 |
| JP | 63-176772 | * | 7/1988 | 74/552 |
| JP | 2000-85586 | * | 3/2000 | 74/552 |
| JP | 2000-85587 | * | 3/2000 | 74/552 |

* cited by examiner

Primary Examiner—Vinh T. Luong
(74) Attorney, Agent, or Firm—Tarolli, Sundheim, Covell & Tummino, L.L.P.

(57) ABSTRACT

A steering wheel includes a hub, a steering wheel rim, at least one spoke connecting the hub and the steering wheel rim, and at least one decorative element. At least one of the steering wheel rim and the spoke have a skeleton and a sheathing surrounding the skeleton. The skeleton has a recess and the decorative element has a fastening element which projects into the recess

3 Claims, 2 Drawing Sheets

STEERING WHEEL COMPRISING A DECORATIVE ELEMENT

TECHNICAL FIELD

The invention relates to a steering wheel comprising at least one decorative element.

BACKGROUND OF THE INVENTION

Conventional steering wheels comprise a hub, a steering wheel rim and at least one spoke connecting the hub and the steering wheel rim. The steering wheel rim and/or the spoke have a skeleton and a foam casing or injected piece surrounding the skeleton.

Decorative elements which cover parts of the steering wheel rim are used for example together with a leather covering of the steering wheel, in order to give the steering wheel a high-quality appearance. These decorative elements have special surfaces, e.g. of wood, imitation wood, aluminum, carbon fiber or the like. In order to enable as flexible a design of the steering wheel as possible, it is desirable that these decorative elements are to be fastened to the steering wheel in a simple manner, so that depending on the desired design the appropriate decorative element can be arranged on a steering wheel base body.

BRIEF SUMMARY OF THE INVENTION

This is achieved in a steering wheel which comprises a hub, a steering wheel rim, at least one spoke connecting the hub and the steering wheel rim, and at least one decorative element. At least one of the steering wheel rim and the spoke have a skeleton and a sheathing surrounding the skeleton. The skeleton has a recess and the decorative element has a fastening element which projects into the recess. Thus, a direct connection with the steering wheel skeleton can be achieved and thereby a secure fastening of the decorative element. No additional parts are required, such as clips, for example.

The skeleton can be provided with any desired number of such recesses, the recesses not required for fastening decorative elements being able to be covered by the sheathing. The term "sheathing" is to be understood in this context as any covering of synthetic material applied on the skeleton by means of injection molding or foaming.

Preferably, the recess is constructed as a through-hole. The skeleton therefore has continuous openings. This is particularly simple to manufacture.

It is advantageous if the fastening element connects the decorative element with the skeleton. It is particularly favorable if the fastening element has detent means, e.g. detent hooks formed in one piece thereon, which can engage on the skeleton. This reduces the number of components which are to be produced. Preferably, the detent means are constructed such that no tool is necessary for fastening the decorative element on the skeleton.

In a preferred embodiment of the invention, the sheathing consists of two shell parts which together surround the skeleton. The shell parts can be produced independently of the skeleton in an injection molding process, so that no special tool has to be provided in order to keep the recess in the skeleton free during the foaming or injection-molding procedure. The shell parts are fitted so as to surround the steering wheel skeleton and are connected with each other in a known manner, e.g. by gluing.

Another preferred embodiment of the invention makes provision that the sheathing has a recess which, as seen in extension of the recess in the skeleton, extends as far as to the outer edge of the sheathing. During applying the sheathing on the steering wheel skeleton, the recess in the skeleton and also a space adjoining thereto and extending up to the outer edge of the sheathing is kept free by the injection molding tool, so that the decorative element is subsequently able to be inserted.

Preferably, the recess is at least partially closed by a plug which, after the steering wheel has been provided with the sheathing, can be inserted in the recess, so that the outer edge of the sheathing is closed. The plug can consist of the same material as the sheathing.

DETAILED DESCRIPTION OF THE PREFERRED EMBODIMENTS

Figure 1:
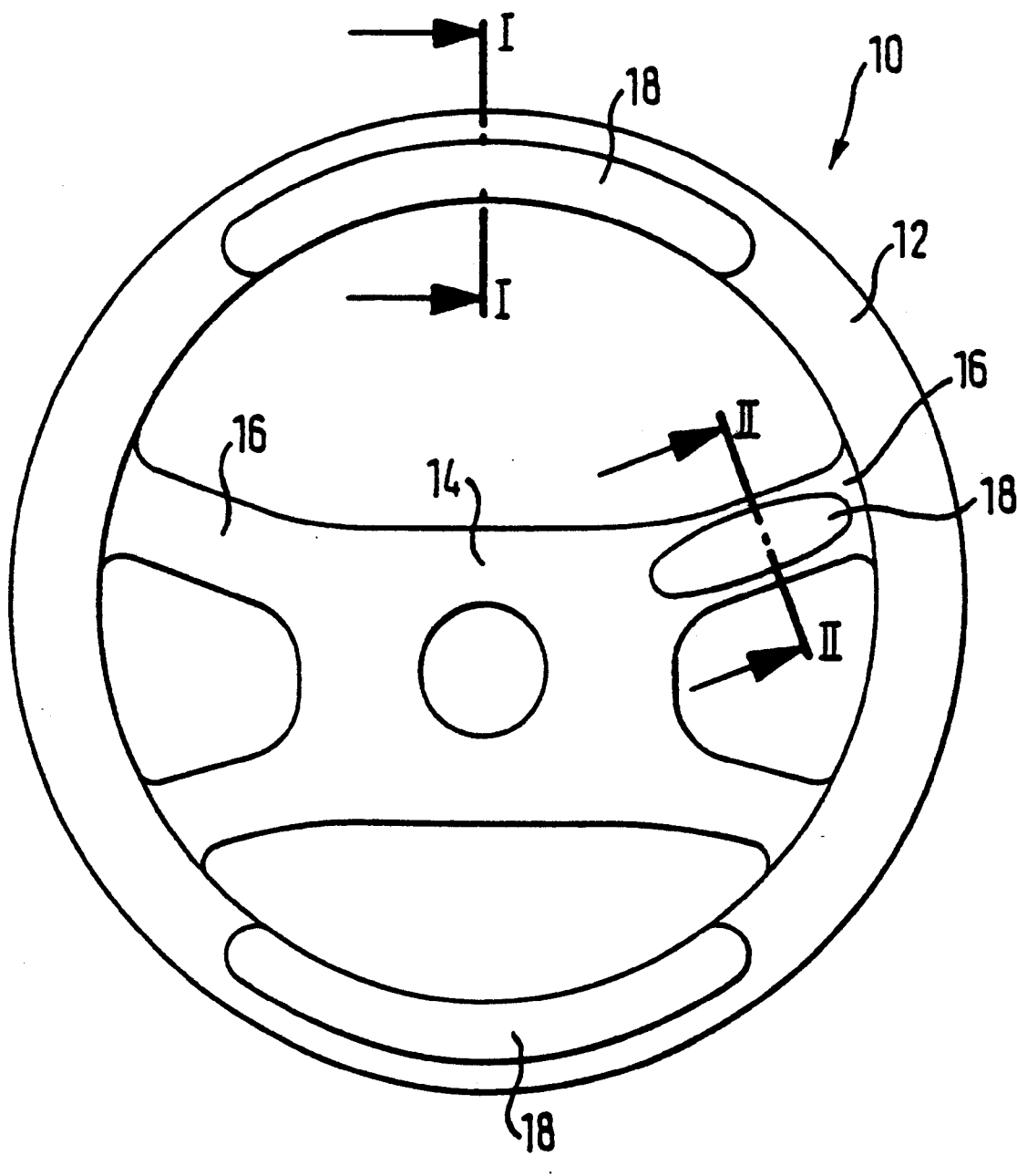
FIG. 1 shows a steering wheel according to the invention, comprising decorative elements.

The steering wheel 10 according to the invention has a steering wheel rim 12, a hub 14 and spokes 16 connecting steering the wheel rim and the hub.

On the steering wheel rim 12 and/or the spokes 16, decorative elements 18 are arranged. The decorative elements 18 extend over a portion of the steering wheel rim and partially surround the steering wheel rim in circumferential direction. On each spoke, in addition, a further decorative element 18 is arranged, only one of which is illustrated. The decorative elements 18 are preferably plastic pieces produced by injection molding, which are provided in addition with a special surface layer (not shown here).

Each decorative element 18 has a fastening element 26 which is arranged on its inner face directed towards the steering wheel rim 12. The fastening element 26 can be constructed in one piece with the decorative element 18. At the free end of the fastening element, which is constructed in the form of a pin-like extension, detent means are constructed, in this case detent hooks 27.

Figure 2:
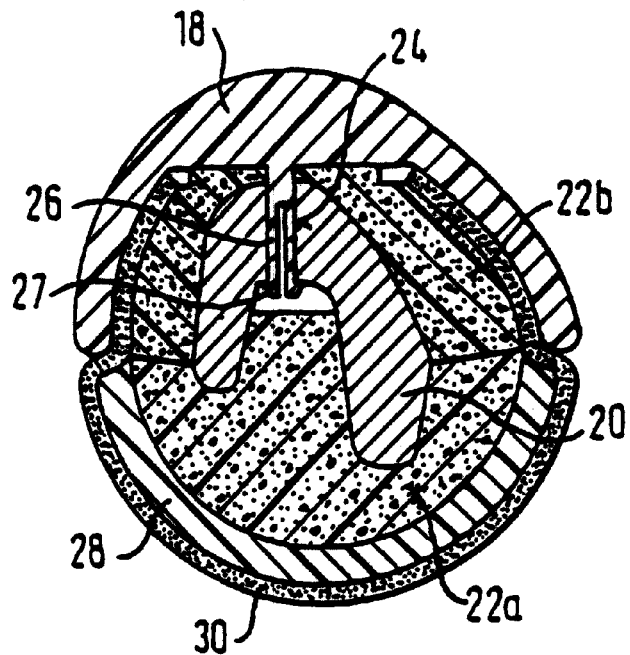
FIG. 2 shows a section through a steering wheel according to the invention in accordance with a first embodiment along the line I—I or II—II of FIG. 1.
Figure 3:
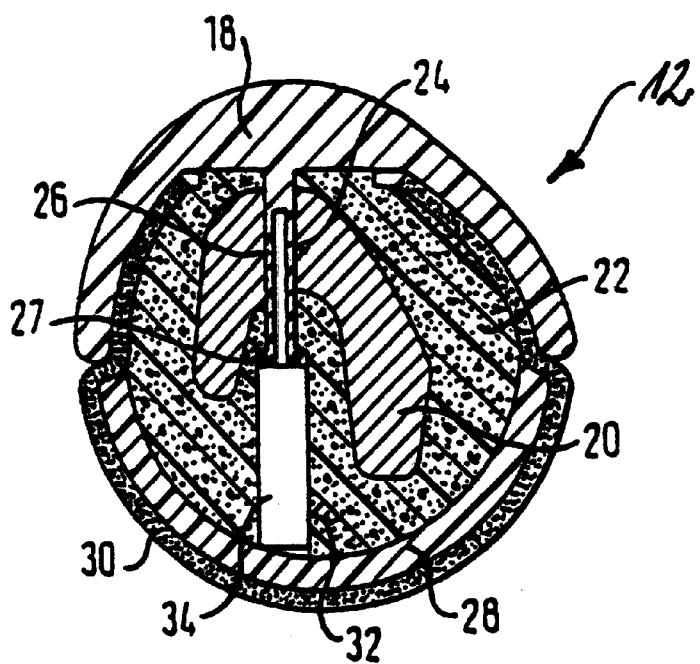
FIG. 3 shows a section through a steering wheel according to the invention in accordance with a second embodiment along the line I—I or II—II of FIG. 1.

As can be seen in FIGS. 2 and 3, the steering wheel rim 12 and/or the spokes 16 have in their interior a skeleton 20 surrounded by a sheathing 22, 22a, 22b. As already stated, this sheathing consists of an injection-molded covering or a covering applied by foaming. In either way of manufacture, the sheathing will be produced with the required external geometry.

According to a first embodiment of the invention, illustrated in FIG. 2, the sheathing consists of two separate shell parts 22a, 22b which are fitted together, i.e. foamed parts are produced in a separate mould, without directly surrounding the skeleton with foam, which, however, would also be possible as an alternative.

The skeleton 20 has a recess 24 which is constructed as a through-hole extending through the skeleton 20.

To compose the steering wheel, the two shell parts 22a, 22b are put together so as to surround the skeleton 20 and are fastened to each other. Then a leather covering 30 can be mounted onto the steering wheel rim and/or the spokes. The decorative element 18 is placed on the steering wheel rim 12 or the spoke 16 such that the fastening element 26 projects into the recess 24 of the skeleton 20 and the detent hooks 27 engage with the rearward edge of the recess. Here, the edges of the leather covering 30 can be clamped under the decorative element 18.

In a second embodiment of the invention, the skeleton 20 again has a recess 24 constructed as a through-hole. The sheathing 22, however, is applied directly on the skeleton 20. During injection-molding or foaming, a recess 32 is left free in order to keep the through-hole 24 free; this being required for reasons of manufacturing.

After injection-molding or foaming, the recess 32 is closed by a plug 34 which can consist of the same material as the sheathing 22, so that the sheathing forms a closed surface. The assembly of the steering wheel takes place as described above.

The engaging of the fastening element 26 can also take place in the sheathing 22, as FIG. 3 shows.

In addition, an insert 28 can be provided in those sections of the steering wheel rim 12 or the spokes 16 that are covered with a decorative element 18, to balance out the thickness of the sheathing.

What is claimed is:

1. A steering wheel (10) comprising:
   a hub (14),
   a steering wheel rim (12),
   at least one spoke (16) connecting said hub (14) and said steering wheel rim (12), and
   at least one decorative element (18),
   at least one of said steering wheel rim (12) and said spoke (16) having a skeleton (20) and a sheathing (22, 22*a*, 22*b*) surrounding said skeleton (20), said skeleton (20) having a recess (24) and said decorative element (18) having a fastening element (26) which projects into said recess (24**),
   wherein said sheathing (22, 22*a*, 22*b*) has a recess (32) which, as seen in extension of said recess (24) in said skeleton (20), extends as far as to an outer edge of said sheathing (22, 22*a*, 22*b*).

2. The steering wheel (10) according to claim 1, wherein said fastening element (26) projects through said recess (24) and is fixed in said sheathing (22, 22*a*, 22*b***).

3. A steering wheel (10) comprising:
   a hub (14),
   a steering wheel rim (12),
   at least one spoke (16) connecting said hub (14) and said steering wheel rim (12),
   at least one of said steering wheel rim (12) and said spoke (16) having a skeleton (20) and a sheathing (22, 22*a*, 22*b*) surrounding said skeleton (20), said skeleton (20) having a recess (24) and said sheathing (22, 22*a*, 22*b*) having a recess (32) which, as seen in extension of said recess (24) in said skeleton (20), extends as far as to an outer edge of said sheathing (22, 22*a*, 22*b***),
   and at least one decorative element (18) having a fastening element (26) which projects into said recess (24) of said skeleton (20),
   a plug (34) being provided by means of which said recess (32) in said sheathing (22, 22*a*, 22*b***) is closed externally at least partially.

* * * * *